(12) United States Patent
Akenine-Moller

(10) Patent No.: US 9,576,384 B2
(45) Date of Patent: Feb. 21, 2017

(54) HIERARCHICAL INDEX BITS FOR MULTI-SAMPLING ANTI-ALIASING

(71) Applicant: Intel Corporation, Santa Clara, CA (US)

(72) Inventor: Tomas G. Akenine-Moller, Lund (SE)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 14/488,368

(22) Filed: Sep. 17, 2014

(65) Prior Publication Data

US 2016/0078586 A1   Mar. 17, 2016

(51) Int. Cl.
*G06T 11/00* (2006.01)
*G06T 1/60* (2006.01)
*G06T 11/40* (2006.01)

(52) U.S. Cl.
CPC .............. *G06T 11/40* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 6,825,847 B1 * | 11/2004 | Molnar | ................ | G09G 5/02 345/555 |
| 7,126,615 B2 | 10/2006 | Liao | | |
| 7,911,480 B2 | 3/2011 | Brothers | | |
| 8,553,041 B1 | 10/2013 | Danskin | | |
| 2006/0103658 A1 * | 5/2006 | Liao | ................ | G09G 5/022 345/545 |
| 2012/0183215 A1 | 7/2012 | Van Hook | | |
| 2013/0249897 A1 | 9/2013 | Dunaisky et al. | | |

OTHER PUBLICATIONS

PCT Written Opinion and Search Report in corresponding PCT application PCT2015046018 dated Feb. 16, 2016 (9 pages).

* cited by examiner

*Primary Examiner* — Said Broome
*Assistant Examiner* — Yu-Jang Tswei
(74) *Attorney, Agent, or Firm* — Trop Pruner & Hu, P.C.

(57) ABSTRACT

In accordance with some embodiments, a control surface stores the index bits in a tile using multi-sampling anti-aliasing. By determining whether all the samples in a tile point to plane 0, one can use only two bits in a control surface for the tile to indicate that all the samples on the tile point to plane 0. Otherwise more than two bits may be stored in the control surface to indicate planes pointed to by the samples of the tile.

27 Claims, 12 Drawing Sheets

HIERARCHICAL INDEX BITS FOR MULTI-SAMPLING ANTI-ALIASING

BACKGROUND

This relates to graphics processing.

It is axiomatic that traffic to memory should be reduced as much as possible in any type of computer architecture, as this saves power and/or provides better performance, or enables other parts in an architecture to exploit more bandwidth.

As such, it is important to compress color data, since this reduces the memory traffic. Multi-sampling anti-aliasing (MSAA) increases the image quality on rendered edges, and it is a common method to increase rendering quality. For 4×MSAA, for example, each tile (e.g., 8×4 pixels) may be divided into 4 planes. Each sample has then 2 index bits (in an index buffer), which indicate which color plane that sample points to. Planes are allocated from low numbers to high numbers, and plane 0 is always allocated. If all samples in a tile point to plane 0, for example, then all index bits are 00.

Compression methods can compress the individual planes, but compression methods do not compress the index buffers. For an 8×4 tile of pixels with four samples per pixel (4×MSAA), the index bits will use 2*4*8*4=256 bits. In some examples, the index bits are using 30% of the memory traffic for color.

BRIEF DESCRIPTION OF THE DRAWINGS

Some embodiments are described with respect to the following figures.

DETAILED DESCRIPTION

Figure 1:
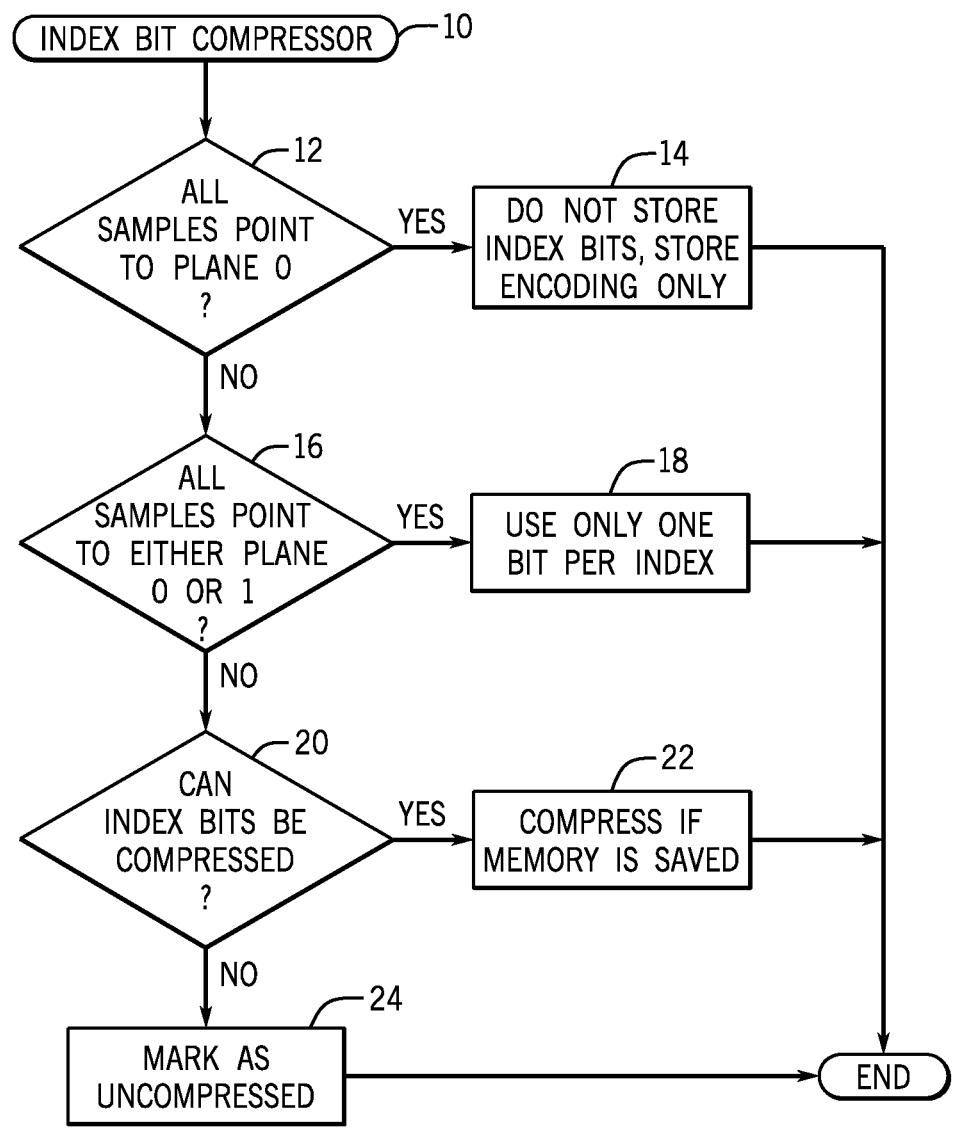
FIG. 1 is a flow chart for one embodiment.

In accordance with some embodiments, a buffer stores the index bits in a tile using multi-sampling anti-aliasing, and for the index bits, a control surface is used to store hierarchical information about each tile. While the index bits (in the particular example above) used 256 bits per tile, only two bits (for example) are used per tile in the control surface. By determining whether all the samples in a tile point to plane 0, one can use these two bits in a control surface and set the bits to 00 for the tile to indicate that all the samples in the tile point to plane 0. Otherwise the two bits need to store either 01, 10, or 11 and these codes can be used to indicate other encodings as discussed below.

There are a substantial number of tiles that may use (1) only plane 0 or (2) only planes 0 and 1. In fact, even for scenes with much higher tessellation rates, the number of instances of case (1) and (2) often accounts for more than 50% of the tiles. In general, these two cases should be compressible.

A control surface is a hierarchical representation of another buffer, and the index bits may be stored in a buffer, and a control surface may be used for the index bits in a tile. This makes it possible to indicate how the index bits in a tile are represented and to encode their representation in fewer bits than what it takes to represent all the index bits in a tile in uncompressed mode. A mode may be introduced where all samples point to plane 0, which does not require any more data. That is, if all index bits in a tile point to plane 0, then instead of setting each index bits to 00 for all samples in such a tile, one can simply use the two bits in the control surface to indicate that this tile has those characteristics. This can be done by, for example, setting the two bits (or any other number, depending on how many are needed) to 00. Furthermore, many tiles just use plane 0or 1, in which case only 1 bit per sample is needed instead of 2 bits per sample in this case. A tile's two bits in the control surface can then use the combination 01 to indicate this case. Note that in this case, an architecture makes it possible to compress the index bits of a tile down to 50%. Furthermore, a simple scheme can further compress more complex index buffers for a tile. In one example, compression may be down to 50%, but this can be generalized, of course.

In this description, several assumptions are made about the tile size, number of samples per pixel, cache line size, etc., but this is just as an example. This can be generalized in all kinds of ways for different setups. Assume an 8×4 pixel tile size, i.e., with 32 pixels per tile, and 4×MSAA, i.e., 2 bits per sample. This amounts to 2*4*32=256 bits per tile for the index bits.

A hierarchical representation of the index bits may be implemented by introducing two bits per tile in a separate control surface per MSAA render target. Their encodings are shown below for one embodiment:

00: all samples in the tile point to plane 0(128:1 compression)

01: the index bits only point to plane 0or 1 (2:1 compression)

10: the index bits are compressed to 50% (2:1 compression), but point to more than 2 planes 11: stored as usual, without compression Hence, 00 means that no index bits need to be stored because all index bits are 00, i.e., they point to plane 0. This means that the index bits do not need to be read if the tile's control surface bits are equal to 00, since in that case all index bits in that tile are 00. This saves memory traffic (a read operation). In the same way, if the index bits of a tile all are 00 and if they need to be written out to memory (or to the next level in a cache hierarchy) then the tile's control surface bits are set to 00, saving memory traffic (a write operation). Since only two bits in total are needed in the control surface to indicate this mode, the compression rate is huge. Instead of 256 bits, only 2 bits are stored, which is 128:1 compression. This technique (i.e. compressed for the case where only plane 0is used) can be used in isolation if one wants to opt for a simple solution that achieves a big part of the performance game. However, in this case it suffices with one bit per tile in the control surface, where 0 can indicate that all index bits in the tile point to plane 0, and where 1 indicates that the index bits of the tile are uncompressed.

Encoding 01 means that all index bits are either 00 or 01. Hence, two bits per index are not needed—only one bit per index (since the most significant bit is the same (0) in both bit combinations). This achieves 2:1 compression for all tiles that have only plane 0 and plane 1, and this will always work for such tiles.

Encoding 10 means that the index bits are compressed to 50% (or less) using a more complex method. This may be as simple as having one bit per 2×2 pixels of index bits, and if this bit is 0 then all index bits in that 2×2 pixel region are the same, and the following two bits indicate what they are. If this bit is 1, the original index bits are just appended to a compressed bitstream. In many cases, this will suffice and if the resulting bitstream is less or equal to 50% then compression succeeds. Otherwise, one needs to send the index bits in uncompressed mode.

However, other methods can be used as well. In one method, a 2×2 region (for example), may be split so that there are two 2-bit values in that region, and those two 2-bit values are first appended to the bitstream, and then each sample in the 2×2 region has one bit pointing to one of these two 2-bit values.

If neither of the methods above work for the 00, 01, and 10 encodings, then, in one embodiment, the tile may be marked as 11, i.e., the index bits of the tile are stored uncompressed, i.e., without compression.

There also needs to be a way to make sure that this actually saves memory bandwidth usage as well. Assume a cache with 1024 bits per cache line (CL) and the bus width is 512 bits. Again, this is just an example, and other CL sizes and bus widths work as well with straightforward extensions. The index bits for four tiles may be stored in 1024 bits (256*4) in uncompressed form. If all four tiles in a CL are in mode 00 (see above), then there is no need to write any data on evict from the cache, and there is no need to read any data either on read requests. Instead, the index bits are filled in the index bit cache with 00s. In all other cases, data needs to be sent. If all tiles in a CL are in 00, 01, or 10 mode, then the sum will be less or equal than 512 bits (or other bus width size), and so all data can be written as a single transaction of 512 bits in the case of a 512 bit bus width.

When one of the tiles is in mode 00 (using 0 bits, except for the 2 bits in the control surface), then a transaction of two times the number of pixels per tile times the number of samples per pixel (e.g. 512 bits or one memory transaction) bits may be used if at least two tiles are compressed with 2:1. The two configurations that are possible are shown below:
 1. 0+128+128+256=512 (where 128 bits indicate 2:1 compression, 256 bits is uncompressed)
 2. 0+128+128+128<512

When two tiles are in mode 00, then the following configurations apply:
 1. 0+0+256+256=512
 2. 0+0+128+256<512
 3. 0+0+128+128<512

When three tiles are in mode 00, then the last tile can be in compressed mode or in uncompressed mode. It will still fit in 512 bits i.e., it fits on one memory transaction (of 512 bits).

In some embodiments, compressed index bits may be grouped for a plurality of tiles to reduce a first number of memory bus transactions, needed if the tiles were not grouped, to a second lower number of memory bus transactions. Thus, you may have a group of tiles that can be transacted over a memory bus in L transactions in uncompressed form. To save bandwidth, the storage of the group of tiles can be reduced down to fewer than L transactions. For example, if the group of tiles is grouped into four tiles with 1024 bits and the bus width is 512 bits, then two memory transactions are needed in uncompressed form. To save bandwidth, the storage of the group of tiles can be reduced down so that there are fewer than L transactions. So by grouping tiles together, one can determine or reduce the number of bus transactions in uncompressed form.

Sometimes, samples that are cleared may be handled. For example, a tile's samples may point to a "cleared" color or to plane 0. One more bit may be added to the control surface per tile to encode this as well. For example, 100 may indicate 2:1 compression, and that each sample has a single bit, where 0 indicates that the sample is cleared and 1 means that the sample points to plane 0.

In accordance with some embodiments, a sequence may implement compression in connection with multi-sampling anti-aliasing. The sequence may be implemented in software, firmware and/or hardware. In software and firmware embodiments it may be implemented by computer executed instructions stored in one or more non-transitory computer readable media such as magnetic, optical or semiconductor storage.

Referring to FIG. 1, the sequence 10 begins, when a tile needs to be written out to memory or to the next level in the cache hierarchy, by detecting whether all samples point to plane 0 as indicated at diamond 12. If so, there is no need to store the index bits and instead the encoding to indicate that the samples point to plane 0 is the only thing that needs to be stored as indicated in block 14.

Otherwise a check at diamond 16 determines whether all samples point to either plane 0 or plane 1. If so, you only use one bit per index as indicated in block 18 for the compression.

On the other hand, a check at diamond 20 determines whether the index bits can in fact be compressed. A couple of techniques were described above that could be used. If so, the compression may be undertaken according to the appropriate technique if memory bandwidth will be saved as indicated in block 22.

Finally if all other options fail, then the block or tile may be marked as uncompressed as indicated in block 24 and the flow ends.

Figure 2:
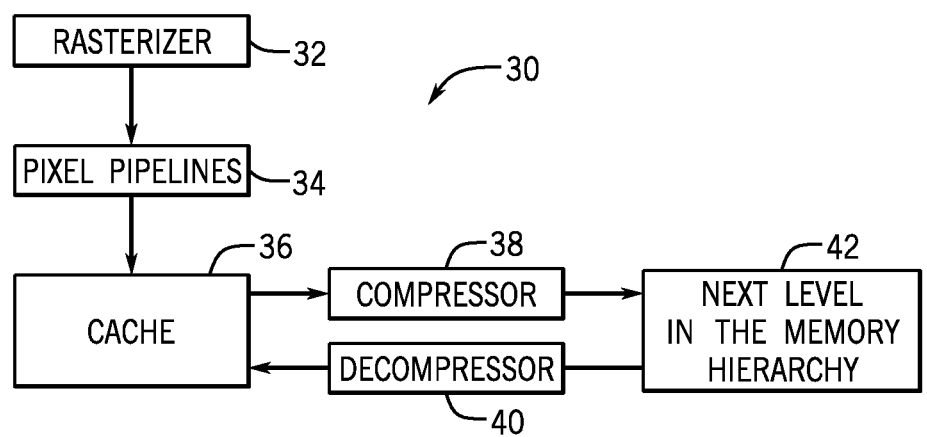
FIG. 2 is a schematic depiction for one embodiment.

Referring to FIG. 2, depicting a graphics pipeline 30, pixel pipelines 34 receive pixels from a rasterizer 32. The rasterizer identifies which pixels lie within a triangle currently being rendered. The rasterizer may operate on a tile of N×M pixels at a time. When the rasterizer finds the tile that partially overlaps the triangle, it distributes the pixels in that tile over a number of pixel pipelines 34. Each pixel pipeline computes the depth and color of a pixel.

The pixel pipelines supply values to a cache 36. On eviction, the cache sends data to the compressor 38 for compression and ultimate storage, as compressed, and the next level in the memory hierarchy 42. Information that hierarchy may then be decompressed in decompressor 40 and supplied to the cache 36.

Figure 3:
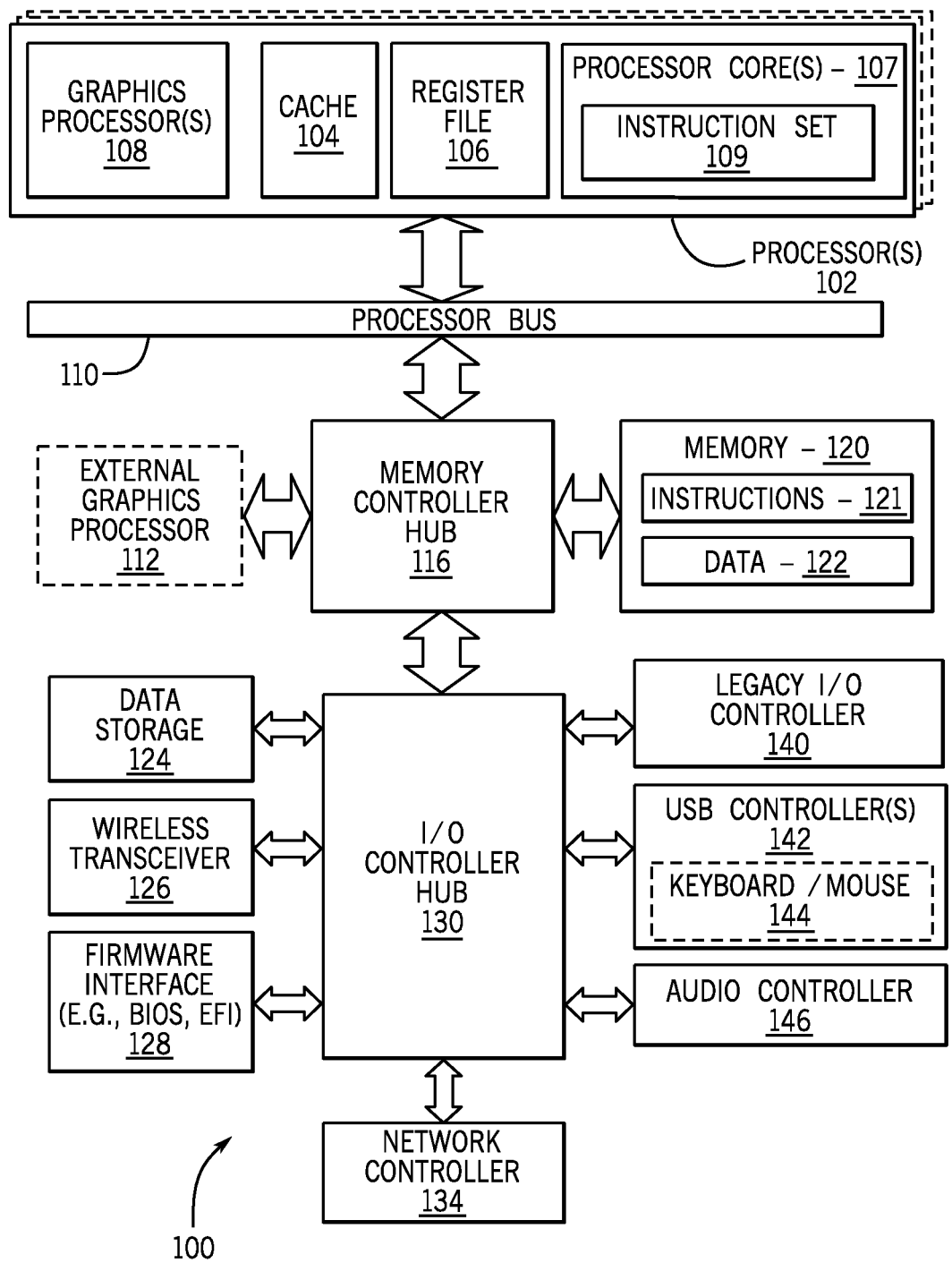
FIG. 3 is a block diagram of a data processing system according to one embodiment.

FIG. 3 is a block diagram of a data processing system 100, according to an embodiment. The data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system on a chip integrated circuit (SOC) for use in mobile, handheld, or embedded devices.

An embodiment of the data processing system 100 can include, or be incorporated within a server-based gaming platform, a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 which may include instructions to facilitate the emulation of other instruction sets. A processor core 107 may also include other processing devices, such a digital signal processor (DSP).

In one embodiment, the processor 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) which may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory 120 can store data 122 and instructions 121 for use when the processor 102 executes a process. The memory controller hub 116 also couples with an optional external graphics processor 112, which may communicate with the one or more graphics processors 108 in the processors 102 to perform graphics and media operations.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

Figure 4:
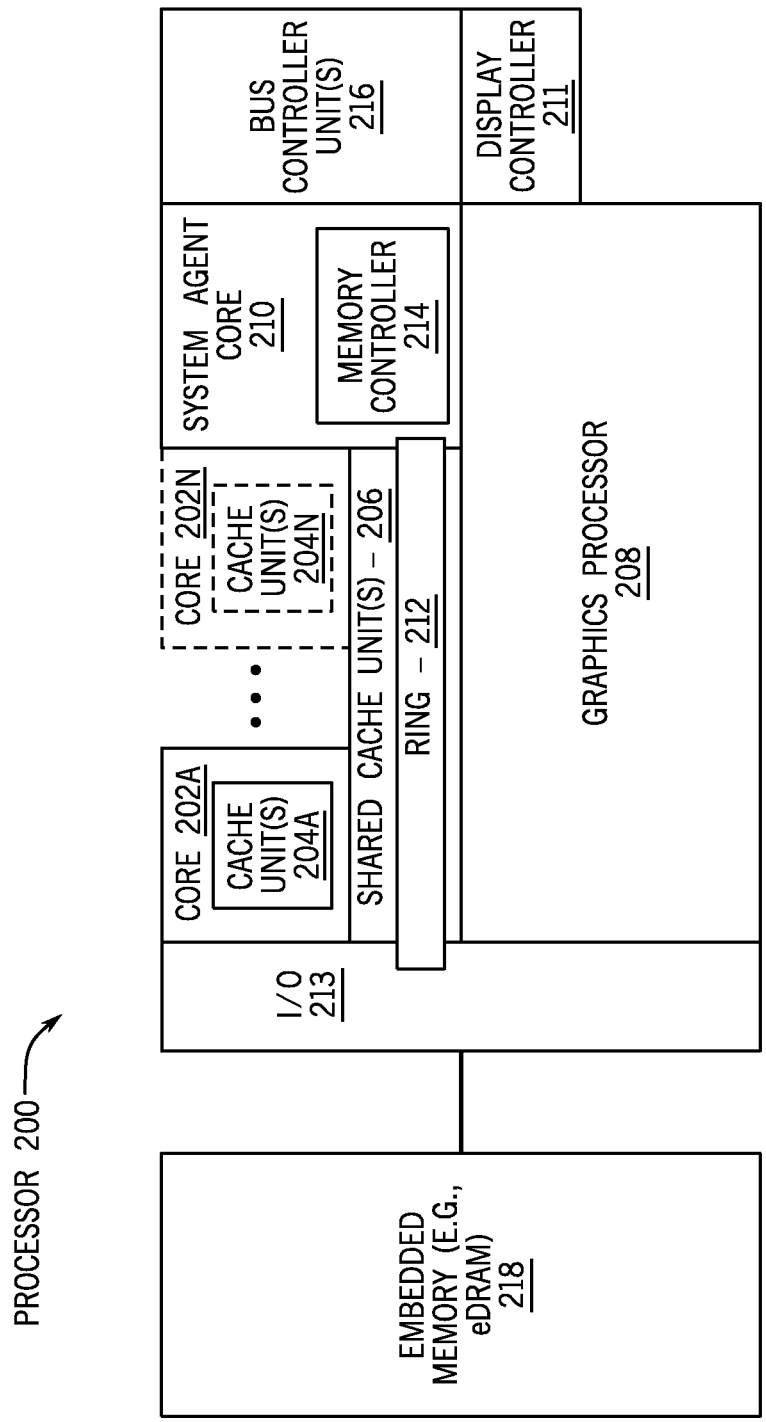
FIG. 4 is a block diagram of the processor shown in FIG. 3 according to one embodiment.

FIG. 4 is a block diagram of an embodiment of a processor 200 having one or more processor cores 202A-N, an integrated memory controller 214, and an integrated graphics processor 208. The processor 200 can include additional cores up to and including additional core 202N represented by the dashed lined boxes. Each of the cores 202A-N includes one or more internal cache units 204A-N. In one embodiment each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 206 and 204A-N.

The processor 200 may also include a set of one or more bus controller units 216 and a system agent 210. The one or more bus controller units manage a set of peripheral buses, such as one or more Peripheral Component Interconnect buses (e.g., PCI, PCI Express). The system agent 210 provides management functionality for the various processor components. In one embodiment, the system agent 210 includes one or more integrated memory controllers 214 to manage access to various external memory devices (not shown).

In one embodiment, one or more of the cores 202A-N include support for simultaneous multi-threading. In such embodiment, the system agent 210 includes components for coordinating and operating cores 202A-N during multi-threaded processing. The system agent 210 may additionally include a power control unit (PCU), which includes logic and components to regulate the power state of the cores 202A-N and the graphics processor 208.

The processor 200 additionally includes a graphics processor 208 to execute graphics processing operations. In one embodiment, the graphics processor 208 couples with the set of shared cache units 206, and the system agent unit 210, including the one or more integrated memory controllers 214. In one embodiment, a display controller 211 is coupled with the graphics processor 208 to drive graphics processor output to one or more coupled displays. The display controller 211 may be separate module coupled with the graphics processor via at least one interconnect, or may be integrated within the graphics processor 208 or system agent 210.

In one embodiment a ring based interconnect unit 212 is used to couple the internal components of the processor 200, however an alternative interconnect unit may be used, such as a point to point interconnect, a switched interconnect, or other techniques, including techniques well known in the art. In one embodiment, the graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In one embodiment each of the cores 202-N and the graphics processor 208 use the embedded memory modules 218 as shared last level cache.

In one embodiment cores 202A-N are homogenous cores executing the same instruction set architecture. In another embodiment, the cores 202A-N are heterogeneous in terms of instruction set architecture (ISA), where one or more of the cores 202A-N execute a first instruction set, while at least one of the other cores executes a subset of the first instruction set or a different instruction set.

The processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 200 can be implemented on one or more chips or as a system on a chip (SOC) integrated circuit having the illustrated components, in addition to other components.

Figure 5:
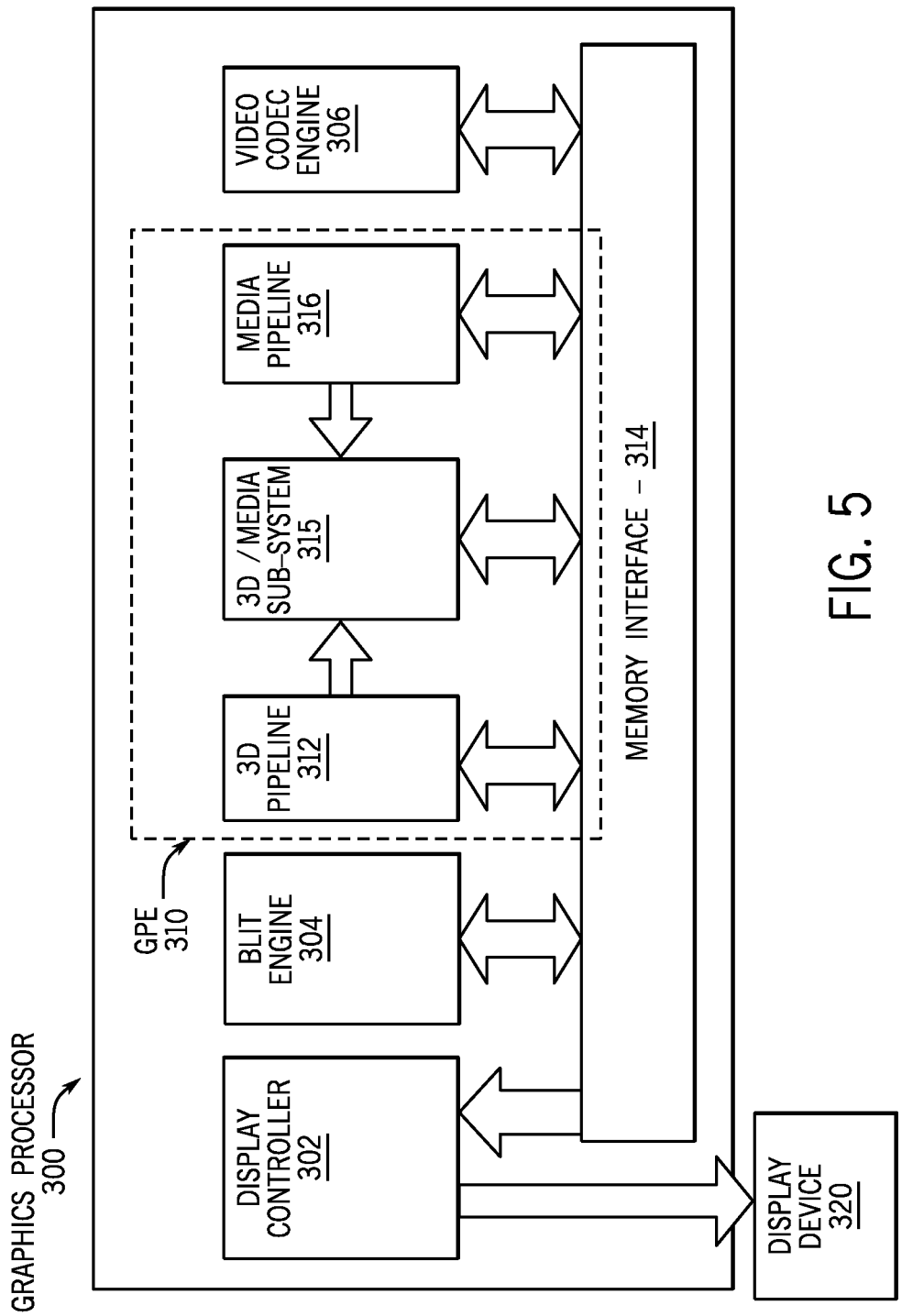
FIG. 5 is a block diagram of the graphics processor of FIG. 3 according to one embodiment.

FIG. 5 is a block diagram of one embodiment of a graphics processor 300 which may be a discreet graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 300 includes a memory interface 314 to access memory. The memory interface 314 can be an interface to local memory, one or more internal caches, one or more shared external caches, and/or to system memory.

The graphics processor 300 also includes a display controller 302 to drive display output data to a display device 320. The display controller 302 includes hardware for one or more overlay planes for the display and composition of multiple layers of video or user interface elements. In one embodiment the graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In one embodiment, the graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. The graphics-processing engine 310 is a compute engine for performing graphics operations, including three-dimensional (3D) graphics operations and media operations.

The GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While the 3D pipeline 312 can be used to perform media operations, an embodiment of the GPE 310 also includes a media pipeline 316 that is specifically used to perform media operations, such as video post processing and image enhancement.

In one embodiment, the media pipeline 316 includes fixed function or programmable logic units to perform one or more specialized media operations, such as video decode acceleration, video de-interlacing, and video encode acceleration in place of, or on behalf of the video codec engine 306. In on embodiment, the media pipeline 316 additionally includes a thread spawning unit to spawn threads for execution on the 3D/Media sub-system 315. The spawned threads perform computations for the media operations on one or more graphics execution units included in the 3D/Media sub-system.

The 3D/Media subsystem 315 includes logic for executing threads spawned by the 3D pipeline 312 and media pipeline 316. In one embodiment, the pipelines send thread execution requests to the 3D/Media subsystem 315, which includes thread dispatch logic for arbitrating and dispatching the various requests to available thread execution resources. The execution resources include an array of graphics execution units to process the 3D and media threads. In one embodiment, the 3D/Media subsystem 315 includes one or more internal caches for thread instructions and data. In one embodiment, the subsystem also includes shared memory, including registers and addressable memory, to share data between threads and to store output data.

Figure 6:
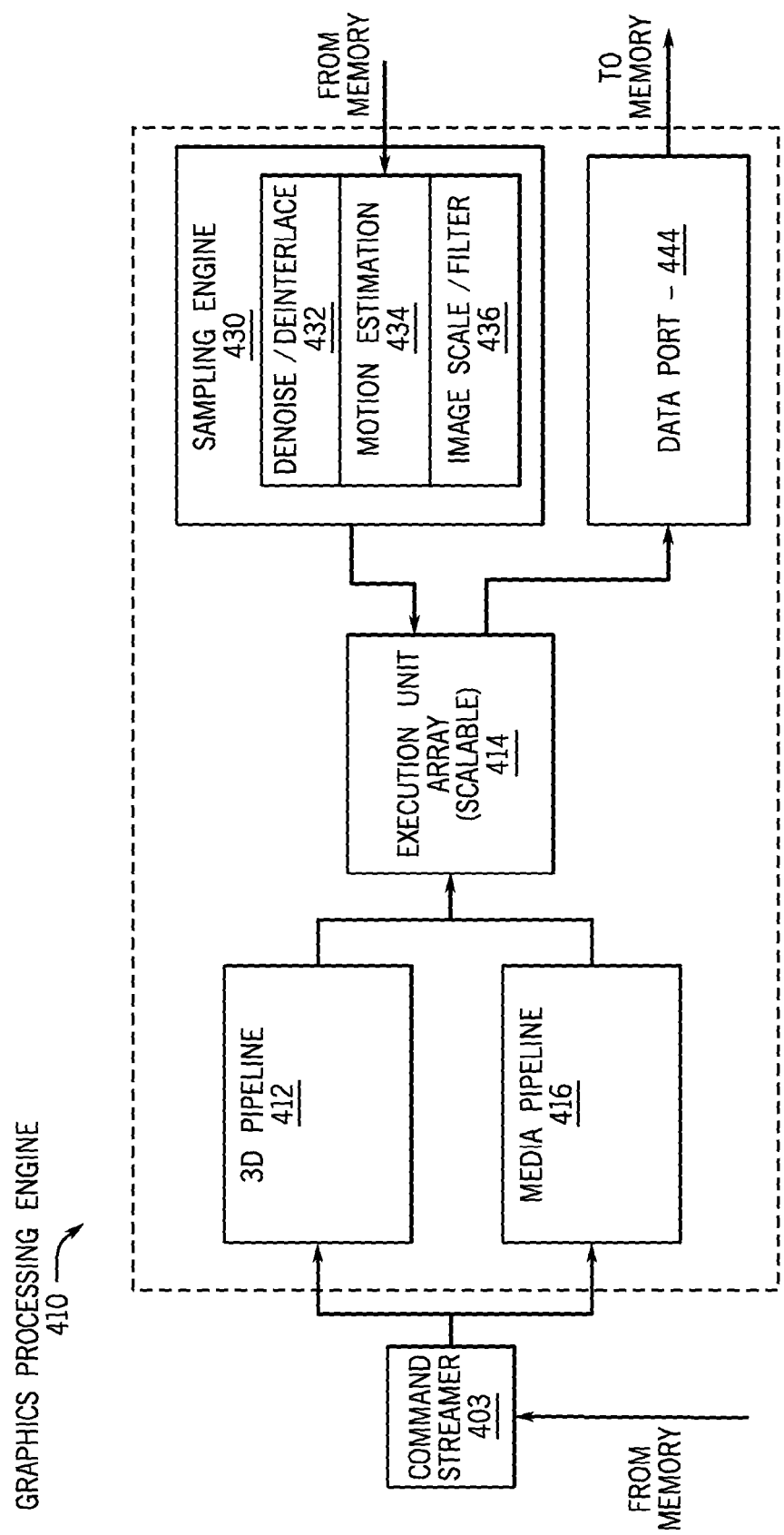
FIG. 6 is a block diagram of a graphics processing engine according to one embodiment.

FIG. 6 is a block diagram of an embodiment of a graphics processing engine 410 for a graphics processor. In one embodiment, the graphics processing engine (GPE) 410 is a version of the GPE 310 shown in FIG. 5. The GPE 410 includes a 3D pipeline 412 and a media pipeline 416, each of which can be either different from or similar to the implementations of the 3D pipeline 312 and the media pipeline 316 of FIG. 5.

In one embodiment, the GPE 410 couples with a command streamer 403, which provides a command stream to the GPE 3D and media pipelines 412, 416. The command streamer 403 is coupled to memory, which can be system memory, or one or more of internal cache memory and shared cache memory. The command streamer 403 receives commands from the memory and sends the commands to the 3D pipeline 412 and/or media pipeline 416. The 3D and media pipelines process the commands by performing operations via logic within the respective pipelines or by dispatching one or more execution threads to the execution unit array 414. In one embodiment, the execution unit array 414 is scalable, such that the array includes a variable number of execution units based on the target power and performance level of the GPE 410.

A sampling engine 430 couples with memory (e.g., cache memory or system memory) and the execution unit array 414. In one embodiment, the sampling engine 430 provides a memory access mechanism for the scalable execution unit array 414 that allows the execution array 414 to read graphics and media data from memory. In one embodiment, the sampling engine 430 includes logic to perform specialized image sampling operations for media.

The specialized media sampling logic in the sampling engine 430 includes a de-noise/de-interlace module 432, a motion estimation module 434, and an image scaling and filtering module 436. The de-noise/de-interlace module 432 includes logic to perform one or more of a de-noise or a de-interlace algorithm on decoded video data. The de-interlace logic combines alternating fields of interlaced video content into a single fame of video. The de-noise logic reduces or remove data noise from video and image data. In one embodiment, the de-noise logic and de-interlace logic are motion adaptive and use spatial or temporal filtering based on the amount of motion detected in the video data. In one embodiment, the de-noise/de-interlace module 432 includes dedicated motion detection logic (e.g., within the motion estimation engine 434).

The motion estimation engine 434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 434 to perform operations on video at the macro-block level that may otherwise be computationally intensive to perform using a general-purpose processor. In one embodiment, the motion estimation engine 434 is generally available to graphics processor components to assist with video decode and processing functions that are sensitive or adaptive to the direction or magnitude of the motion within video data.

The image scaling and filtering module 436 performs image-processing operations to enhance the visual quality of generated images and video. In one embodiment, the scaling and filtering module 436 processes image and video data during the sampling operation before providing the data to the execution unit array 414.

In one embodiment, the graphics processing engine 410 includes a data port 444, which provides an additional mechanism for graphics subsystems to access memory. The data port 444 facilitates memory access for operations including render target writes, constant buffer reads, scratch memory space reads/writes, and media surface accesses. In one embodiment, the data port 444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 414 communicate with the data port by exchanging messages via a data distribution interconnect that couples each of the sub-systems of the graphics processing engine 410.

Figure 7:
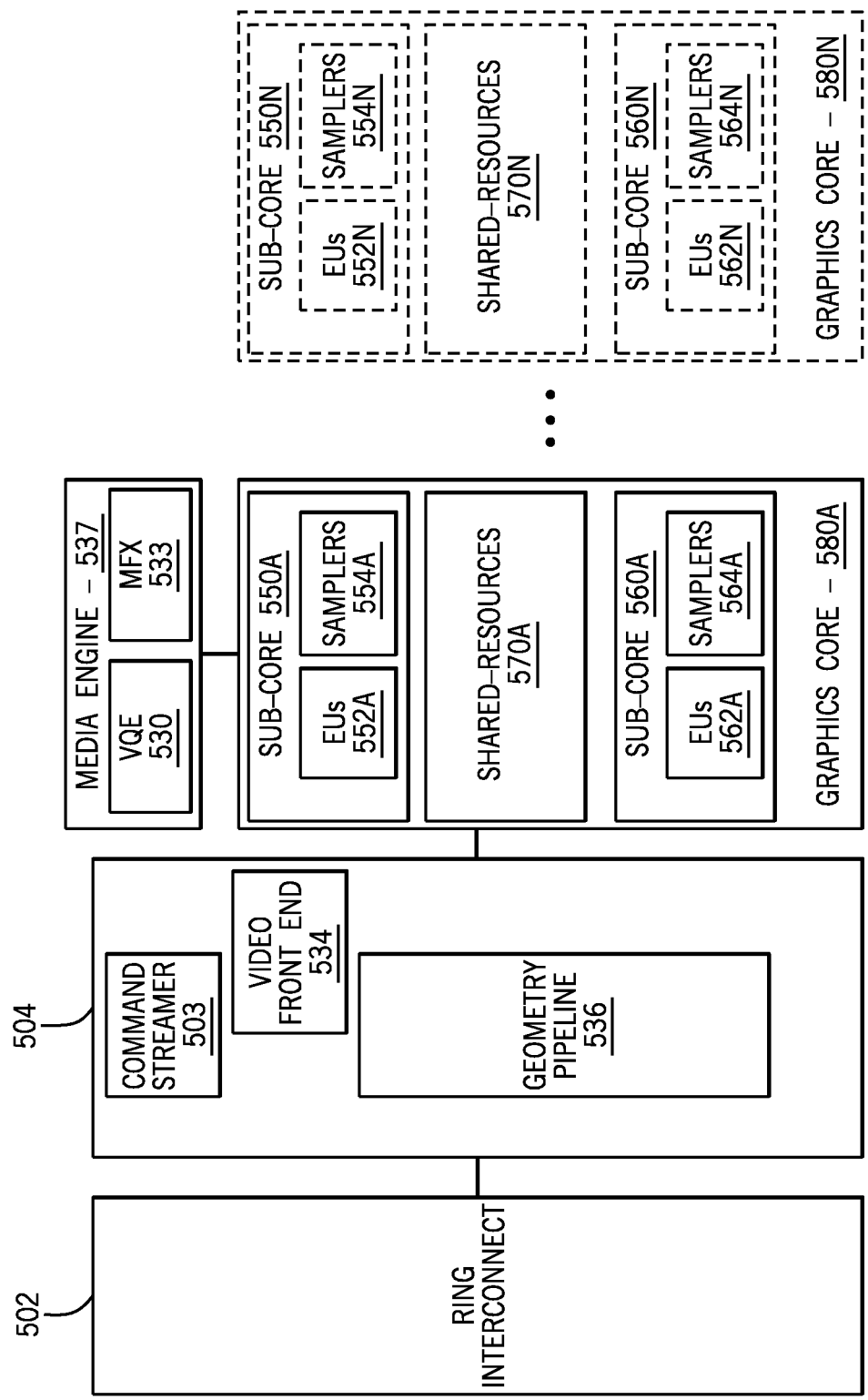
FIG. 7 is a block diagram of a graphics processor according to another embodiment.

FIG. 7 is a block diagram of another embodiment of a graphics processor. In one embodiment, the graphics processor includes a ring interconnect 502, a pipeline front-end 504, a media engine 537, and graphics cores 580A-N. The ring interconnect 502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 502. The incoming commands are interpreted by a command streamer 503 in the pipeline front-end 504. The graphics processor includes scalable execution logic to perform 3D geometry processing and media processing via the graphics core(s) 580A-N. For 3D geometry processing commands, the command streamer 503 supplies the commands to the geometry pipeline 536. For at least some media processing commands, the command streamer 503 supplies the commands to a video front end 534, which couples with a media engine 537. The media engine 537 includes a video quality engine (VQE) 530 for video and image post processing and a multi-format encode/decode (MFX) 533 engine to provide hardware-accelerated media data encode and decode. The geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In one embodiment, the graphics processor includes a graphics core 580A having at least a first sub-core 550A and a second core sub-core 560A. In another embodiment, the graphics processor is a low power processor with a single sub-core (e.g., 550A). In one embodiment, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In one embodiment, each sub-core 550A-N, 560A-N shares a set of shared resources 570A-N. In one embodiment, the shared resources include shared cache memory and pixel operation logic. Other shared resources may also be included in the various embodiments of the graphics processor.

Figure 8:
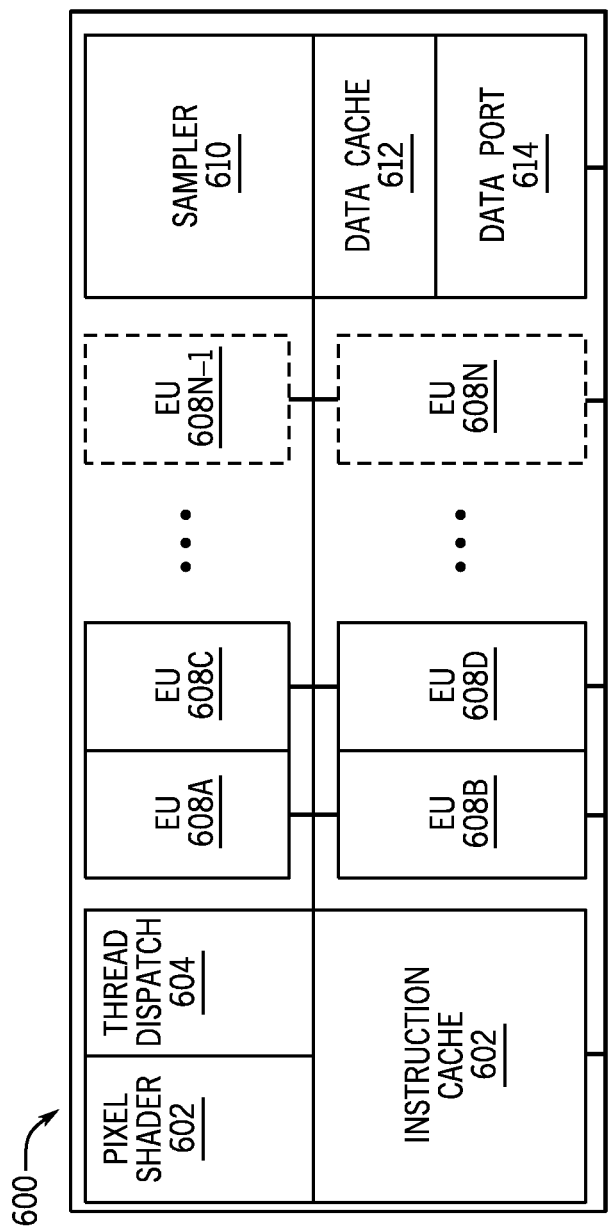
FIG. 8 illustrates thread execution logic for one embodiment.

FIG. 8 illustrates thread execution logic 600 including an array of processing elements employed in one embodiment of a graphics processing engine. In one embodiment, the thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. The thread execution logic 600 includes one or more connections to memory, such as system memory or cache memory, through one or more of the instruction cache 606, the data port 614, the sampler 610, and the execution unit array 608A-N. In one embodiment, each execution unit (e.g. 608A) is an individual vector processor capable of executing multiple simultaneous threads and processing multiple data elements in parallel for each thread. The execution unit array 608A-N includes any number individual execution units.

In one embodiment, the execution unit array 608A-N is primarily used to execute "shader" programs. In one embodiment, the execution units in the array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In one embodiment, one or more data caches (e.g., 612) are included to cache thread data during thread execution. A sampler 610 is included to provide texture sampling for 3D operations and media sampling for media operations. In one embodiment, the sampler 610 includes specialized texture or media sampling functionality to process texture or media data during the sampling process before providing the sampled data to an execution unit.

During execution, the graphics and media pipelines send thread initiation requests to the thread execution logic 600 via thread spawning and dispatch logic. The thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 6) dispatches vertex processing, tessellation, or geometry processing threads to the thread execution logic 600. The thread dispatcher 604 can also process runtime thread spawning requests from the executing shader programs.

Once a group of geometric objects have been processed and rasterized into pixel data, the pixel shader 602 is invoked to further compute output information and cause results to be written to output surfaces (e.g., color buffers, depth buffers, stencil buffers, etc.). In one embodiment, the pixel shader 602 calculates the values of the various vertex attributes that are to be interpolated across the rasterized object. The pixel shader 602 then executes an API-supplied pixel shader program. To execute the pixel shader program, the pixel shader 602 dispatches threads to an execution unit (e.g., 608A) via the thread dispatcher 604. The pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In one embodiment, the data port 614 provides a memory access mechanism for the thread execution logic 600 output processed data to memory for processing on a graphics processor output pipeline. In one embodiment, the data port 614 includes or couples to one or more cache memories (e.g., data cache 612) to cache data for memory access via the data port.

Figure 9:
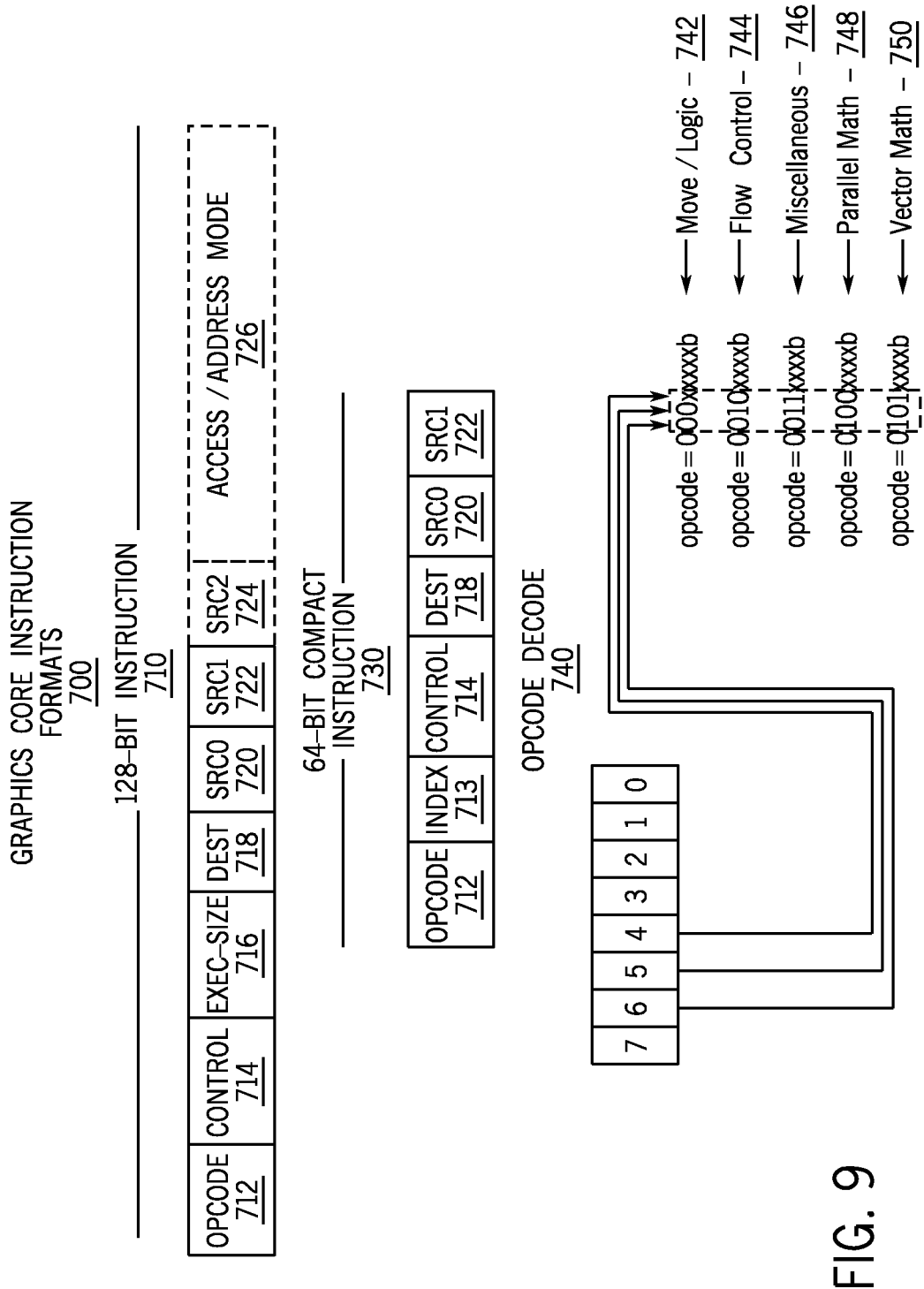
FIG. 9 is a block diagram of a graphics processor execution unit instruction format according to one embodiment.

FIG. 9 is a block diagram illustrating a graphics processor execution unit instruction format according to an embodiment. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In one embodiment, the instruction is compacted in part using a set of index values in an index field 713. The execution unit hardware references a set of compaction tables based on the index values and uses the compaction table outputs to reconstruct a native instruction in the 128-bit format 710.

For each format, an instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 712 enables control over certain execution options, such as channels selection (e.g., predication) and data channel order (e.g., swizzle). For 128-bit instructions 710 an exec-size field 716 limits the number of data channels that will be executed in parallel. The exec-size field 716 is not available for use in the 64-bit compact instruction format 730.

Some execution unit instructions have up to three operands including two source operands, src0 720, src1 722, and one destination 718. In one embodiment, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In one embodiment instructions are grouped based on opcode bit-fields to simplify Opcode decode 740. For an 8-bit opcode, bits 4, 5, and 6 allow the execution unit to determine the type of opcode. The precise opcode grouping shown is exemplary. In one embodiment, a move and logic opcode group 742 includes data movement and logic instructions (e.g., mov, cmp). The move and logic group 742 shares the five most significant bits (MSB), where move instructions are in the form of 0000xxxxb (e.g., 0x0x) and logic instructions are in the form of 0001xxxxb (e.g., 0x01). A flow control instruction group 744 (e.g., call, jmp) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, mul) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 10:
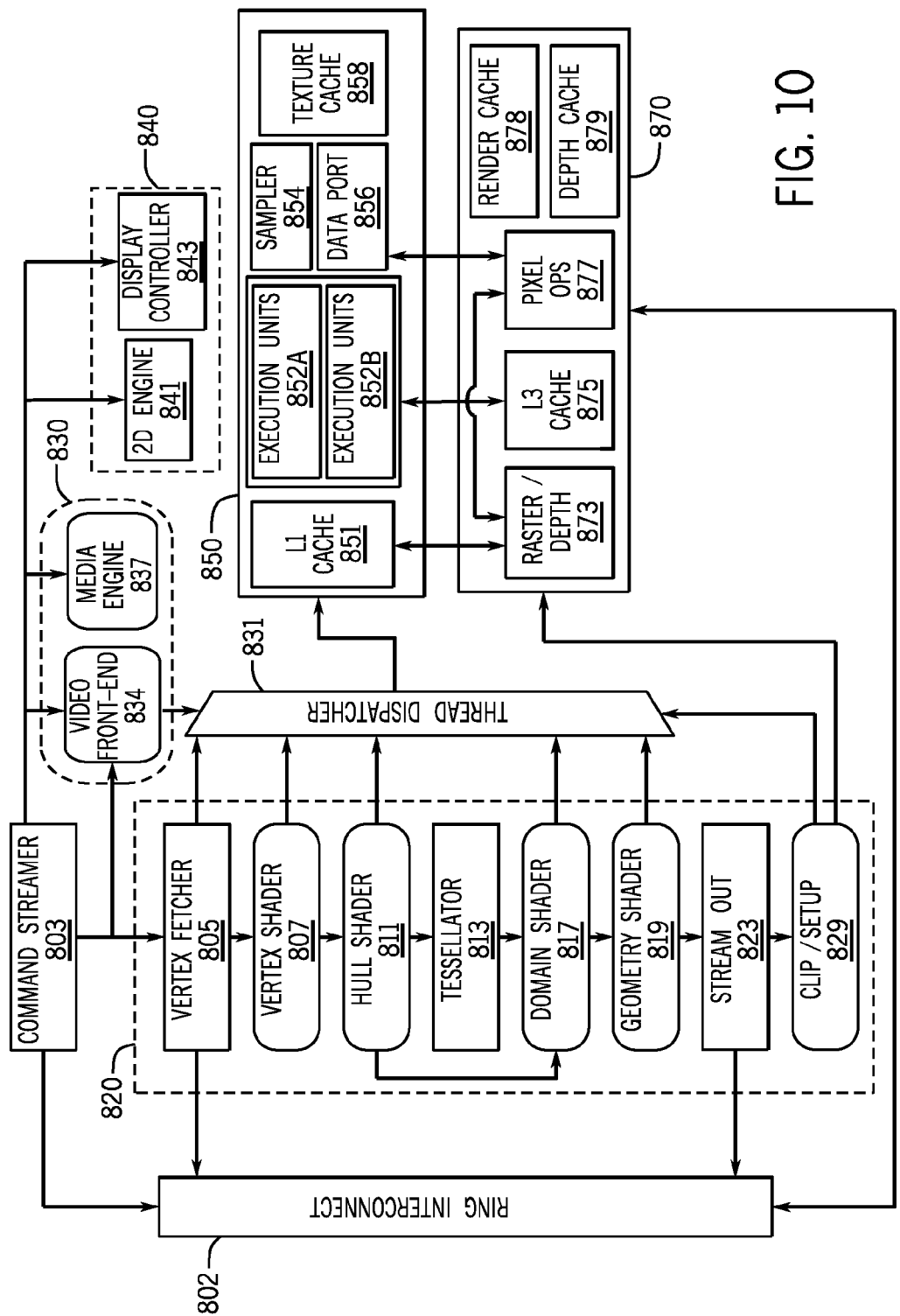
FIG. 10 is a block diagram of another embodiment of a graphics processor.

FIG. 10 is a block diagram of another embodiment of a graphics processor which includes a graphics pipeline 820, a media pipeline 830, a display engine 840, thread execution logic 850, and a render output pipeline 870. In one embodiment, the graphics processor is a graphics processor within a multi-core processing system that includes one or more general purpose processing cores. The graphics processor is controlled by register writes to one or more control registers (not shown) or via commands issued to the graphics processor via a ring interconnect 802. The ring interconnect 802 couples the graphics processor to other processing components, such as other graphics processors or general-purpose processors. Commands from the ring interconnect are interpreted by a command streamer 803 which supplies instructions to individual components of the graphics pipeline 820 or media pipeline 830.

The command streamer 803 directs the operation of a vertex fetcher 805 component that reads vertex data from memory and executes vertex-processing commands provided by the command streamer 803. The vertex fetcher 805 provides vertex data to a vertex shader 807, which performs coordinate space transformation and lighting operations to each vertex. The vertex fetcher 805 and vertex shader 807 execute vertex-processing instructions by dispatching execution threads to the execution units 852A, 852B via a thread dispatcher 831.

In one embodiment, the execution units 852A, 852B are an array of vector processors having an instruction set for performing graphics and media operations. The execution units 852A, 852B have an attached L1 cache 851 that is specific for each array or shared between the arrays. The cache can be configured as a data cache, an instruction cache, or a single cache that is partitioned to contain data and instructions in different partitions.

In one embodiment, the graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. If tessellation is not used, the tessellation components 811, 813, 817 can be bypassed.

The complete geometric objects can be processed by a geometry shader 819 via one or more threads dispatched to the execution units 852A, 852B, or can proceed directly to the clipper 829. The geometry shader operates on entire geometric objects, rather than vertices or patches of vertices as in previous stages of the graphics pipeline. If the tessellation is disabled the geometry shader 819 receives input from the vertex shader 807. The geometry shader 819 is programmable by a geometry shader program to perform geometry tessellation if the tessellation units are disabled.

Prior to rasterization, vertex data is processed by a clipper 829, which is either a fixed function clipper or a programmable clipper having clipping and geometry shader functions. In one embodiment, a rasterizer 873 in the render output pipeline 870 dispatches pixel shaders to convert the geometric objects into their per pixel representations. In one embodiment, pixel shader logic is included in the thread execution logic 850.

The graphics engine has an interconnect bus, interconnect fabric, or some other interconnect mechanism that allows data and message passing amongst the major components of the graphics engine. In one embodiment the execution units 852A, 852B and associated cache(s) 851, texture and media sampler 854, and texture/sampler cache 858 interconnect via a data port 856 to perform memory access and communicate with render output pipeline components of the graphics engine. In one embodiment, the sampler 854, caches 851, 858 and execution units 852A, 852B each have separate memory access paths.

In one embodiment, the render output pipeline 870 contains a rasterizer and depth test component 873 that converts vertex-based objects into their associated pixel-based representation. In one embodiment, the rasterizer logic includes a windower/masker unit to perform fixed function triangle and line rasterization. An associated render and depth buffer caches 878, 879 are also available in one embodiment. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In one embodiment a shared L3 cache 875 is available to all graphics components, allowing the sharing of data without the use of main system memory.

The graphics processor media pipeline 830 includes a media engine 837 and a video front end 834. In one embodiment, the video front end 834 receives pipeline commands from the command streamer 803. However, in one embodiment the media pipeline 830 includes a separate command streamer. The video front-end 834 processes media commands before sending the command to the media engine 837. In one embodiment, the media engine includes thread spawning functionality to spawn threads for dispatch to the thread execution logic 850 via the thread dispatcher 831.

In one embodiment, the graphics engine includes a display engine 840. In one embodiment, the display engine 840 is external to the graphics processor and couples with the graphics processor via the ring interconnect 802, or some other interconnect bus or fabric. The display engine 840 includes a 2D engine 841 and a display controller 843. The display engine 840 contains special purpose logic capable of operating independently of the 3D pipeline. The display controller 843 couples with a display device (not shown), which may be a system integrated display device, as in a laptop computer, or an external display device attached via an display device connector.

The graphics pipeline 820 and media pipeline 830 are configurable to perform operations based on multiple graphics and media programming interfaces and are not specific to any one application programming interface (API). In one embodiment, driver software for the graphics processor translates API calls that are specific to a particular graphics or media library into commands that can be processed by the graphics processor. In various embodiments, support is provided for the Open Graphics Library (OpenGL) and Open Computing Language (OpenCL) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 11A:
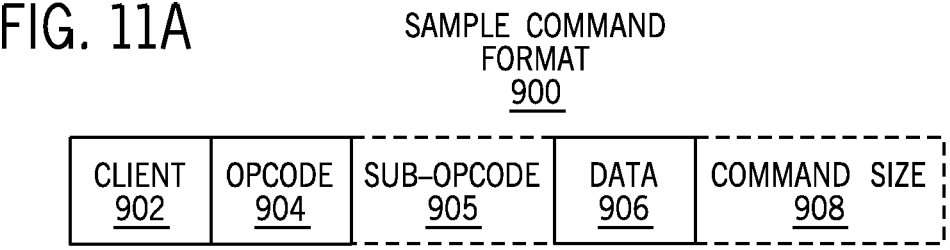
FIG. 11A is a block diagram of a graphics processor command format according to one embodiment.
Figure 11B:
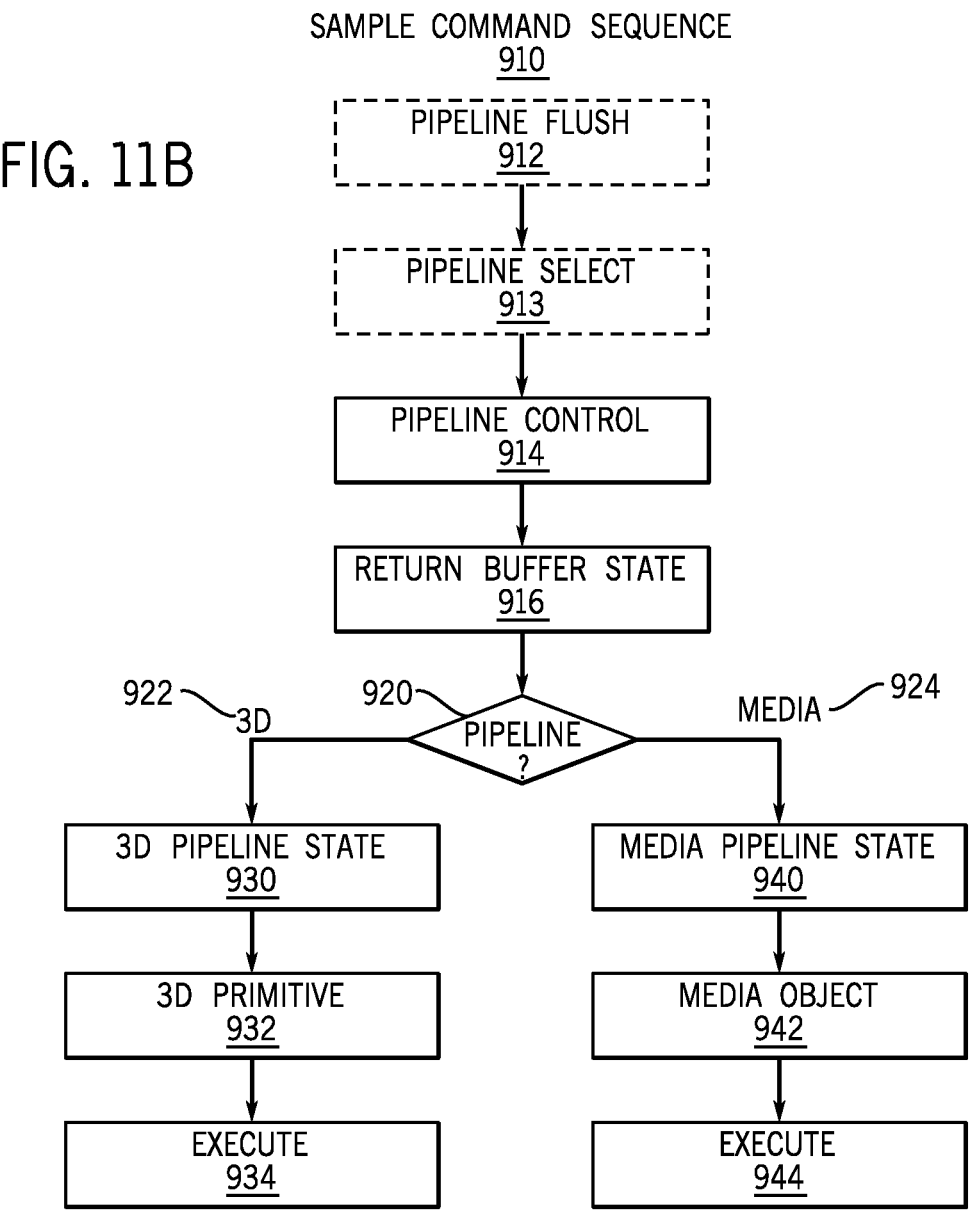
FIG. 11B is a block diagram of a graphics processor command sequence according to one embodiment.

FIG. 11A is a block diagram illustrating a graphics processor command format according to an embodiment and FIG. 11B is a block diagram illustrating a graphics processor command sequence according to an embodiment. The solid lined boxes in FIG. 11A illustrate the components that are generally included in a graphics command while the dashed lines include components that are optional or that are only included in a sub-set of the graphics commands. The exemplary graphics processor command format 900 of FIG. 11A includes data fields to identify a target client 902 of the command, a command operation code (opcode) 904, and the relevant data 906 for the command. A sub-opcode 905 and a command size 908 are also included in some commands.

The client 902 specifies the client unit of the graphics device that processes the command data. In one embodiment, a graphics processor command parser examines the client field of each command to condition the further processing of the command and route the command data to the appropriate client unit. In one embodiment, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in the data 906 field of the command. For some commands an explicit command size 908 is expected to specify the size of the command. In one embodiment, the command parser automatically determines the size of at least some of the commands based on the command opcode. In one embodiment commands are aligned via multiples of a double word.

The flow chart in FIG. 11B shows a sample command sequence 910. In one embodiment, software or firmware of a data processing system that features an embodiment of the graphics processor uses a version of the command sequence shown to set up, execute, and terminate a set of graphics operations. A sample command sequence is shown and described for exemplary purposes, however embodiments are not limited to these commands or to this command sequence. Moreover, the commands may be issued as batch of commands in a command sequence, such that the graphics processor will process the sequence of commands in an at least partially concurrent manner.

The sample command sequence 910 may begin with a pipeline flush command 912 to cause any active graphics pipeline to complete the currently pending commands for the pipeline. In one embodiment, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. A pipeline flush command 912 can be used for pipeline synchronization or before placing the graphics processor into a low power state.

A pipeline select command 913 is used when a command sequence requires the graphics processor to explicitly switch between pipelines. A pipeline select command 913 is required only once within an execution context before issuing pipeline commands unless the context is to issue commands for both pipelines. In one embodiment, a pipeline flush command is 912 is required immediately before a pipeline switch via the pipeline select command 913.

A pipeline control command 914 configures a graphics pipeline for operation and is used to program the 3D pipeline 922 and the media pipeline 924. The pipeline control command 914 configures the pipeline state for the active pipeline. In one embodiment, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. The return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. 3D pipeline state 930 commands are also able to selectively disable or bypass certain pipeline elements if those elements will not be used.

The 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. The 3D primitive 932 command is used to perform vertex operations on 3D primitives via vertex shaders. To process vertex shaders, the 3D pipeline 922 dispatches shader execution threads to graphics processor execution units.

The 3D pipeline 922 is triggered via an execute 934 command or event. In one embodiment a register write triggers command execution. In one embodiment execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

The media pipeline 924 is configured in a similar manner as the 3D pipeline 922. A set of media pipeline state commands 940 are dispatched or placed into in a command queue before the media object commands 942. The media pipeline state commands 940 include data to configure the media pipeline elements that will be used to process the media objects. This includes data to configure the video decode and video encode logic within the media pipeline, such as encode or decode format. The media pipeline state commands 940 also support the use one or more pointers to "indirect" state elements that contain a batch of state settings.

Media object commands 942 supply pointers to media objects for processing by the media pipeline. The media objects include memory buffers containing video data to be processed. In one embodiment, all media pipeline state must be valid before issuing a media object command 942. Once the pipeline state is configured and media object commands 942 are queued, the media pipeline 924 is triggered via an execute 934 command or an equivalent execute event (e.g., register write). Output from the media pipeline 924 may then be post processed by operations provided by the 3D pipeline 922 or the media pipeline 924. In one embodiment, GPGPU operations are configured and executed in a similar manner as media operations.

Figure 12:
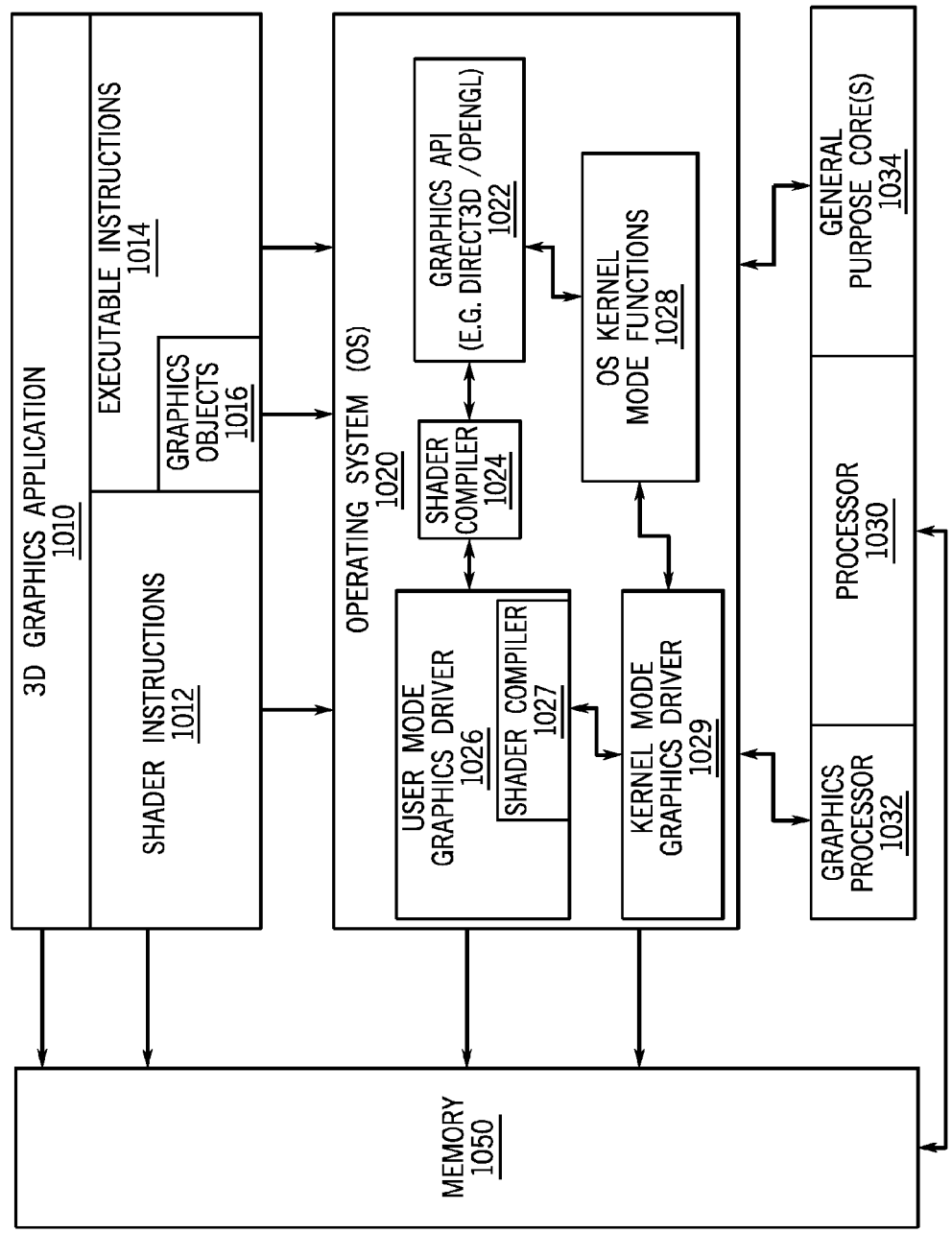
FIG. 12 is a graphics software architecture for one embodiment.

FIG. 12 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The following clauses and/or examples pertain to further embodiments:

One example embodiment may be a method comprising determining in the course of multi-sampling anti-aliasing whether all samples in a tile point to plane 0, and if so, storing an indication in a control surface for the tile that all samples in the tile point to plane 0. The method may also include storing only N bits as said indication and using one bit encoding to indicate that all samples point to plane 0. The method may also include determining whether the samples only point to the zero and one planes, and indicating with another unused encoding in the N bits that the samples in the tile only point to plane zero and plane one. The method may also include wherein if the samples only point to the zero one planes, using one bit per index to indicate which plane the samples point to. The method may also include wherein if the samples point to more planes than plane 0 and 1, attempting to compress the index bits using at least two different techniques. The method may also include wherein if the index bits cannot be compressed, providing an indication that the index bits cannot be compressed. The method may also include if the index bits can be compressed, checking whether use of the compression technique actually saves memory bandwidth. The method may also include providing a two bit per tile hierarchical representation of the index bits in a control surface per render target. The method may also include wherein if the index bits only point to the zero plane, then refraining from performing a memory transaction. The method may also include grouping compressed index bits for a plurality of tiles to reduce a first number of memory bus transactions needed if the tiles were not grouped to a second number of memory bus transactions. The method may also include using a control surface to indicate whether a sample points to a cleared color or to plane 0.

Another example embodiment may be one or more non-transitory computer readable media storing instructions executed by a processor to perform a sequence comprising determining in the course of multi-sampling anti-aliasing whether all samples in a tile point to plane 0, and if so, storing an indication in a control surface for the tile that all samples in the tile point to plane 0. The media may further store said sequence including storing only N bits as said indication and using one bit encoding to indicate that all samples point to plane 0. The media may further store instructions to perform said sequence determining whether the samples only point to the zero and one planes, and indicating with another unused encoding in the N bits that the samples in the tile only point to plane zero and plane one. The media may further store instructions to perform a sequence wherein if the samples only point to the zero one planes, said sequence including using one bit per index to indicate which plane the samples point to. The media may further store instructions to perform said sequence wherein if the samples point to more planes than plane 0 and 1, said sequence including attempting to compress the index bits using at least two different techniques. The media may further store instructions to perform a sequence wherein if the index bits cannot be compressed, said sequence including providing an indication that the index bits cannot be compressed. The media may further store instructions to perform said sequence including if the index bits can be compressed, said sequence including checking whether use of the compression technique actually saves memory bandwidth. The media may further store instructions to perform said sequence wherein if the index bits only point to the zero plane, then said sequence including refraining from performing a memory transaction. The media may further store instructions to perform said sequence including grouping compressed index bits for a plurality of tiles to reduce a first number of memory bus transactions needed if the tiles were not grouped to a second number of memory bus transactions.

In another example embodiment may be an apparatus comprising a processor to determine in the course of multi-sampling anti-aliasing whether all samples in a tile point to plane 0, and if so, store an indication in a control surface for the tile that all samples in the tile point to plane 0, and a storage coupled to said processor. The apparatus may include said processor to store only N bits as said indication and using one bit encoding to indicate that all samples point to plane 0. The apparatus may include said processor to determine whether the samples only point to the zero and one planes, and indicating with another unused encoding in the N bits that the samples in the tile only point to plane zero and plane one. The apparatus may include said processor wherein if the samples only point to the zero one planes, said processor to use one bit per index to indicate which plane the samples point to. The apparatus may include said processor wherein if the samples point to more planes than plane 0 and 1, said processor to attempt to compress the index bits using at least two different techniques. The apparatus may include said processor wherein if the index bits cannot be compressed, said processor to provide an indication that the index bits cannot be compressed. The apparatus may include if the index bits can be compressed, said processor to check whether use of the compression technique actually saves memory bandwidth. The apparatus may include said processor wherein if the index bits only point to the zero plane, then said processor to refrain from performing a memory transaction. The apparatus may include said processor to group compressed index bits for a plurality of tiles to reduce a first number of memory bus transactions needed if the tiles were not grouped to a second number of memory bus transactions. The apparatus may include an operating system.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   determining in the course of multi-sampling anti-aliasing whether all samples in a tile point to plane 0;
   if so, storing an indication in a control surface for the tile that all samples in the tile point to plane 0; and
   grouping compressed index bits for a plurality of tiles to reduce a first number of memory bus transactions needed if the tiles were not grouped to a second number of memory bus transactions.

2. The method of claim 1 including storing only N bits as said indication and using one bit encoding to indicate that all samples point to plane 0.

3. The method of claim 2 determining whether the samples only point to the plane 0 and to a plane 1, and indicating with another unused encoding in the N bits that the samples in the tile only point to plane 0 and plane 1.

4. The method of claim 3 wherein if the samples only point to the plane 0 and 1, using one bit per index to indicate which plane the samples point to.

5. The method of claim 4 wherein if the samples point to more planes than planes 0 and 1, attempting to compress the index bits using at least two different techniques.

6. The method of claim 5 wherein if the index bits cannot be compressed, providing an indication that the index bits cannot be compressed.

7. The method of claim 5 including if the index bits can be compressed, checking whether use of the compression technique actually saves memory bandwidth.

8. The method of claim 1 including providing a two bit per tile hierarchical representation of the index bits in a control surface per render target.

9. The method of claim 1 wherein if the index bits only point to the zero plane, then refraining from performing a memory transaction.

10. The method of claim 1 including using a control surface to indicate whether a sample points to a cleared color or to plane 0.

11. One or more non-transitory computer readable media storing instructions executed by a processor to perform a sequence comprising:
    determining in the course of multi-sampling anti-aliasing whether all samples in a tile point to plane 0;
    if so, storing an indication in a control surface for the tile that all samples in the tile point to plane 0; and
    grouping compressed index bits for a plurality of tiles to reduce a first number of memory bus transactions needed if the tiles were not grouped to a second number of memory bus transactions.

12. The media of claim 11, said sequence including storing only N bits as said indication and using one bit encoding to indicate that all samples point to plane 0.

13. The media of claim 12, said sequence determining whether the samples only point to the plane 0 and to a plane 1, and indicating with another unused encoding in the N bits that the samples in the tile only point to plane zero and plane one.

14. The media of claim 13 wherein if the samples only point to the planes 0 and 1, said sequence including using one bit per index to indicate which plane the samples point to.

15. The media of claim 14 wherein if the samples point to more planes than plane 0 and 1, said sequence including attempting to compress the index bits using at least two different techniques.

16. The media of claim 15 wherein if the index bits cannot be compressed, said sequence including providing an indication that the index bits cannot be compressed.

17. The media of claim 15, said sequence including if the index bits can be compressed, said sequence including checking whether use of the compression technique actually saves memory bandwidth.

18. The media of claim 11 wherein if the index bits only point to the zero plane, then said sequence including refraining from performing a memory transaction.

19. An apparatus comprising:
    a processor to determine in the course of multi-sampling anti-aliasing whether all samples in a tile point to plane 0, and if so, store an indication in a control surface for the tile that all samples in the tile point to plane 0, group compressed index bits for a plurality of tiles to reduce a first number of memory bus transactions needed if the tiles were not grouped to a second number of memory bus transactions; and
    a storage coupled to said processor.

20. The apparatus of claim 19, said processor to store only N bits as said indication and using one bit encoding to indicate that all samples point to plane 0.

21. The apparatus of claim 20, said processor to determine whether the samples only point to the plane 0 and plane 1, and indicating with another unused encoding in the N bits that the samples in the tile only point to plane 0 and plane 1.

22. The apparatus of claim 21 wherein if the samples only point to the planes 0 and 1, said processor to use one bit per index to indicate which plane the samples point to.

23. The apparatus of claim 22 wherein if the samples point to more planes than plane 0 and 1, said processor to attempt to compress the index bits using at least two different techniques.

24. The apparatus of claim 23 wherein if the index bits cannot be compressed, said processor to provide an indication that the index bits cannot be compressed.

25. The apparatus of claim 23 including if the index bits can be compressed, said processor to check whether use of the compression technique actually saves memory bandwidth.

26. The apparatus of claim 19 wherein if the index bits only point to the zero plane, then said processor to refrain from performing a memory transaction.

27. The apparatus of claim 19 including an operating system.

* * * * *